United States Patent
Moberg et al.

(10) Patent No.: US 9,152,279 B2
(45) Date of Patent: Oct. 6, 2015

(54) TOOL AND METHOD FOR AUTHENTICATING TRANSACTIONS

(75) Inventors: Claus Christopher Moberg, Madison, WI (US); Matthew Charles Luedke, Madison, WI (US); Ryan M. Brown, Madison, WI (US)

(73) Assignee: SnowShoeFood, Inc., Madison, WI (US)

( * ) Notice: Subject to any disclaimer, the term of this patent is extended or adjusted under 35 U.S.C. 154(b) by 314 days.

(21) Appl. No.: 13/385,049

(22) Filed: Jan. 31, 2012

(65) Prior Publication Data

US 2013/0194202 A1 Aug. 1, 2013

(51) Int. Cl.
*G06F 3/041* (2006.01)
*G06F 3/044* (2006.01)

(52) U.S. Cl.
CPC ...... *G06F 3/044* (2013.01); *G06F 2203/04104* (2013.01)

(58) Field of Classification Search
CPC ......................................................... G06F 3/041
USPC .................................................. 345/173, 174
See application file for complete search history.

(56) References Cited

U.S. PATENT DOCUMENTS

| 4,123,631 | A | * | 10/1978 | Lewis | 200/600 |
| 5,559,665 | A | * | 9/1996 | Taranowski et al. | 361/280 |
| 7,106,221 | B2 | * | 9/2006 | Horton et al. | 341/33 |
| 7,683,888 | B1 | † | 3/2010 | Kennedy | |
| 8,019,321 | B2 | | 9/2011 | Engstrom | |
| 2004/0124248 | A1 | * | 7/2004 | Selker | 235/492 |
| 2009/0265544 | A1 | | 10/2009 | Moona | |
| 2010/0045627 | A1 | † | 2/2010 | Kennedy | |
| 2010/0321304 | A1 | | 12/2010 | Rofougaran | |
| 2012/0007808 | A1 | | 1/2012 | Heatherly et al. | |
| 2012/0007817 | A1 | | 1/2012 | Heatherly et al. | |
| 2012/0120020 | A1 | * | 5/2012 | Lee | 345/174 |
| 2012/0218220 | A1 | * | 8/2012 | Tsai | 345/174 |
| 2012/0249295 | A1 | | 10/2012 | Yeung | |
| 2013/0194202 | A1 | | 8/2013 | Moberg et al. | |

FOREIGN PATENT DOCUMENTS

| CN | 101976146 | | 2/2011 |
| DE | 202010011032 | U1 † | 10/2011 |
| FR | 2948794 | | 4/2011 |
| JP | 2011026768 | | 2/2011 |
| WO | WO 2007/099412 | | 9/2007 |

* cited by examiner
† cited by third party

*Primary Examiner* — Fred Tzeng
(74) *Attorney, Agent, or Firm* — Jeffrey Schox; Thomas Gwinn

(57) ABSTRACT

This invention relates to a hardware tool for interacting with an "intelligent device" such as a "smart phone," e.g., Apple Corporation's "iPhone", or other devices with certain comparable capabilities, such as the Apple "iPad" tablet computer, and to a method for authorizing transactions based on successful interaction. More specifically, the invention relates to employment of a hardware tool having contact members for contacting the touch-sensitive screens of such devices at plural locations in specific spatial relation to one another. The device, running an application program or "app", then detects the locations at which the screen has been thus contacted, and compares those locations to stored locations specific to a particular type of transaction, and, if the detected locations match a set of stored locations, authorizes the transaction to proceed.

17 Claims, 4 Drawing Sheets

TOOL AND METHOD FOR AUTHENTICATING TRANSACTIONS

FIELD OF THE INVENTION

This invention relates to a hardware tool for interacting with an "intelligent device" such as a "smart phone," e.g., Apple Corporation's "iPhone", or other devices with certain comparable capabilities, such as the Apple "iPad" tablet computer, devices of similar capabilities such as various devices capable of running Google's Android operating system, and to a method for authenticating transactions based on successful interaction. More specifically, the invention relates to employment of a hardware tool having contact members for contacting the multi-touch-sensitive screens of such devices at plural locations in specific spatial relation to one another. The device, running an application program or "app", then detects the locations at which the screen has been thus contacted, and compares those locations to stored locations specific to a particular type of transaction. This comparison step can be performed by the device itself or via communication over the Internet with an external computer device. If the detected locations match a set of stored locations, the device then authorizes the transaction to proceed. In a further embodiment the contacts may be controlled to be activated in a specified sequence, one or more of the points can be moved mechanically across the device's screen or the entire tool can be moved with respect to the screen; these actions can likewise be detected and compared to stored information in order to authorize a transaction.

BACKGROUND AND SUMMARY OF THE INVENTION

Numerous "intelligent devices" now available, such as "smartphones" such as the Apple iPhone, and tablet computer devices, such as the Apple iPod Touch, Apple iPad, and like devices incorporating touch sensitive screens capable of accepting touch inputs from a plurality of locations simultaneously, also have the ability to download and run software implementing application programs or "apps". According to the invention, these devices and apps running thereon can be employed together with novel hardware tools for identifying a person, location, business or the like (the "other party" herein) in order to authenticate that other party and thereby to authorize any of a wide variety of transactions.

This capability can be used to replace or supplant other means of authentication and to simplify the corresponding transactions.

General Configuration:

In a first embodiment, the hardware tool (referred to herein as the "Smart Stamp tool") is composed of a mass of conductive material with a certain number (typically up to five for cooperating with iPhones, up to eleven for iPads) of contact pads that are proud of a flat surface. These points are positioned on the surface in a specific configuration that is unique to each exemplar of the device.

General Functionality:

When the Smart Stamp tool is placed on the multi-touch-sensitive screen of an intelligent device such as a smartphone or tablet computer, the protruding contact pads make contact with the screen and their locations are detected by the device's capacitive sensors. An application program ("app") running on the device (or on a remote server) mathematically compares the detected locations of the Smart Stamp tool's contact pads to a reference file containing parametric data for versions of the Smart Stamp tool that are authorized with respect to the specific device.

More specifically, as presently implemented, software provided according to the invention includes an app residing locally on the user's smart device to observe the location of any five points of capacitive contact on the device's multi-touch-sensitive screen ("the observed points"). The software computes data that is parametric of the location and orientation of the five contact points. This parametric data is then submitted via internet communication protocols to a second software program residing on a remote server ("the server software"). The server software mathematically compares the parametric data calculated by the app to data similarly parametric of a set of known authorized point configurations for that app; that is, the server software determines whether the configuration of the detected contact points corresponds to a set of stored contact point locations. The server software returns data to the app indicating whether the observed points satisfied any and all criteria established in comparison with the known authorized points. In this configuration, the server software is capable of serving an authenticating role for a large number of unique apps, each of which would have their own set of one or more unique authorized point configurations.

It would also be possible to have both the steps of calculating the observed point parametric data and comparison thereof with authorized point configurations occur locally on the user's smart device in a single app, that is, without involvement of a separate server.

Example of Use:

The art is generally aware of so-called "loyalty cards". In a coffee shop example, a customer may be given a card upon a first purchase, and the card punched, using a tool for punching a uniquely-shaped hole, by the cashier when subsequent transactions are consummated. When, for example, the number of total transactions reaches a given number, as indicated by the number of punches having been removed from the card, the customer may be given the next comparable purchase free. The card, being issued and punched by the coffee shop, thus serves to record the number of transactions, the unique shape of the shop's punch authenticates that each punch in the card was executed by an authorized representative of the shop, and possession of the card by the user authenticates the individual user to the coffee shop.

In order to replace the loyalty card with the user's smart device, the smart phone or other intelligent device is used in lieu of the card to store information recording the number of prior transactions, comparable to the punches removed, while the Smart Stamp tool is used in lieu of the uniquely-shaped punch to authenticate each transaction in a reliable and secure manner.

More specifically, the Smart Stamp tool can be employed in cooperation with an intelligent device to authenticate "punches" in a coffee shop loyalty app. The coffee shop will keep a unique Smart Stamp at the point of sale. (A chain of coffee shops would have different Smart Stamps at each location, and the app would be capable of recognizing each and tracking their usage. The app could then transmit this information to the proprietor of the app, for transmission to the management of the chain or other interested parties.)

A customer will place an order in the normal way, and enter the products being purchased in the shop's customer loyalty smartphone app—that is, the purchase data will be stored by an app unique to that shop that is running on the user's smartphone. The app will prompt the customer to show their phone to the cashier, and the cashier will authenticate the purchase with the Smart Stamp. The app, possibly via interaction with a server-side program, will confirm that the Smart Stamp's physical characteristics as measured match the stored characteristics corresponding to that coffee shop, and if so, will then retain a count of the number of such authentications. When the specified number of purchases has been accumulated, the app would indicate this to the cashier, who would then provide the reward.

Note that the security features built into these devices are such as to make user "hacking" of a legitimate app impractical; that is, it would be difficult for the device user to "fool" the device into indicating that the specified number of purchases had been made in order to defraud the merchant. Accordingly, there should be no reluctance on the part of the merchant to allow the user's device to keep track of the total. Alternatively, the totals could and might preferably be tracked by remote servers via internet communication between the app and the servers.

Other uses for the authentication feature provided by the Smart Stamp tool will occur to those of skill in the art, such as apps that would allow deliverymen to identify authorized recipients of packages, identifying specific patients to pharmacists, redeeming coupons or other value-laden offers or vouchers at retail establishments, identifying passengers on trains, airplanes and the like, identifying ticket holders at events, and the like.

For example, the user's smart phone could be used to replace a ticket for a concert, and the Smart Stamp tool to replace the ticket taker. The user would buy his or her ticket through a smartphone app designed to interact with the Smart Stamp. The user could then simply contact the device screen at the entrance to the concert venue with a Smart Stamp tool. The successful authentication would then cause the app to generate an "OK" screen which could be shown to an entry guard, or a barcode or the like, which could be scanned by an automated door operator to allow passage.

In another embodiment, the device could be used as part of a digital coupon delivery and redemption system. In such a system, third party actors (such as a product manufacturer) would be able to commission coupon-based discounts on items for sale at a retailer. A shopper would use an app to browse, evaluate and select coupons for use. At checkout, to receive the discount(s) promised by their selected coupon(s), the shopper would simply display the smart device to a cashier, who would check to make sure the item(s) required by the selected coupon(s) were being purchased, would sell the products at the discounted price promised by the coupon(s), and would certify that the coupons had been redeemed by authenticating the coupon redemption via the app on the shopper's smart device using the Smart Stamp. This authentication, communicated to a remote business server using internet communication protocols, might then trigger a financial transaction whereby the third party compensated the retailer for the financial value of the discount(s) provided to the shopper.

It is also within the scope of the invention that the Smart Stamp tool could be provided to the user and used as a sort of identification card, so as to be shown to a reader comprising a touch screen device.

BRIEF DESCRIPTION OF THE DRAWINGS

The invention will be better understood if reference is made to the accompanying drawings, in which.

DETAILED DESCRIPTION OF THE PREFERRED EMBODIMENTS

Figure 1:
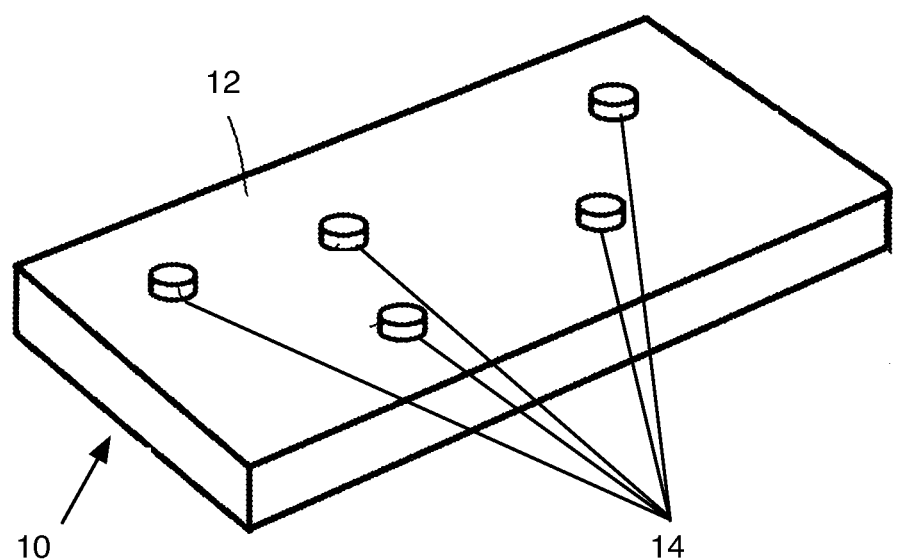
FIG. 1 is a perspective view of a first embodiment of the Smart Stamp tool of the invention.
Figure 2:
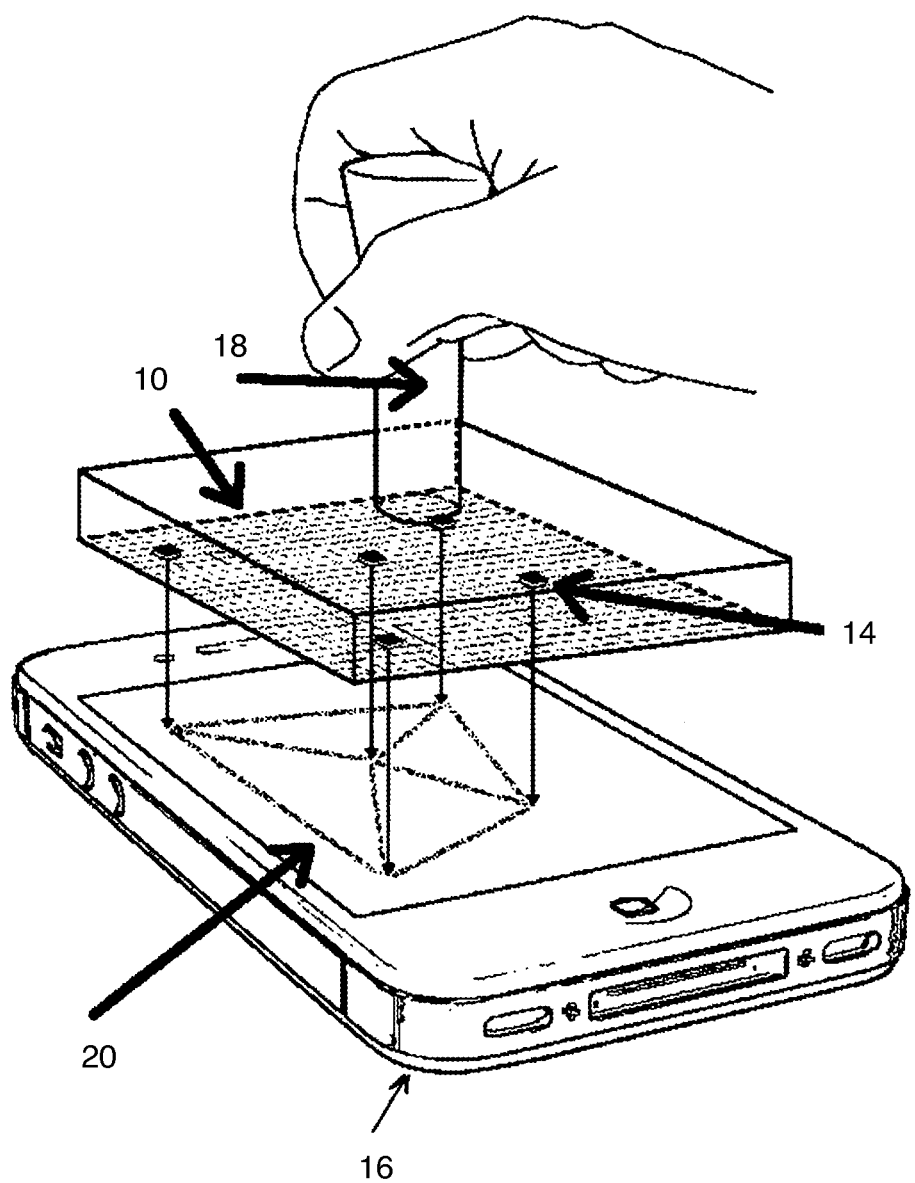
FIG. 2 is a schematic diagram showing the manner in which the Smart Stamp tool can be brought into contact with the touch-sensitive screen of an iPhone, iPad or similar device.

As discussed above, FIG. 1 shows the simplest embodiment of the Smart Stamp tool 10, in which it simply comprises a block 12 of electrically-conductive material, e.g., aluminum, with a number of contact pads 14 formed integrally therewith or assembled thereto, in electrical contact with the block 12. The contact pads 14 are proud of the surface of the block 12, and are of equal height, so that they can contact the touch screen of a smart phone or like intelligent device simultaneously. See FIG. 2, illustrating the manner in which the user places the Smart Stamp tool 10 in contact with the screen 20 of the smart phone 16. As illustrated, the tool 10 may be provided with a conductive gripping knob 18, so that the capacitance of the user's hand is in electrical contact with the contact pads 14.

In order to accept user input by way of finger contact, the screen 20 is designed so as to be able to sense a change in the electromagnetic state at the outer surface of the screen (such as the change that would be effected by the presence of a human finger or similarly sized conductive body), and the smartphone 16 comprises software so as to be able to locate the coordinates of the center of a point of contact. In this way, users can provide input data with a high degree of resolution using a fingertip as a blunt pointer, in effect. As mentioned above, the Apple iPhone smartphone 16 is capable of simultaneously locating up to at least five contact points to a high degree of resolution; other smart devices may be able to identify fewer or larger numbers of points.

Figure 3:
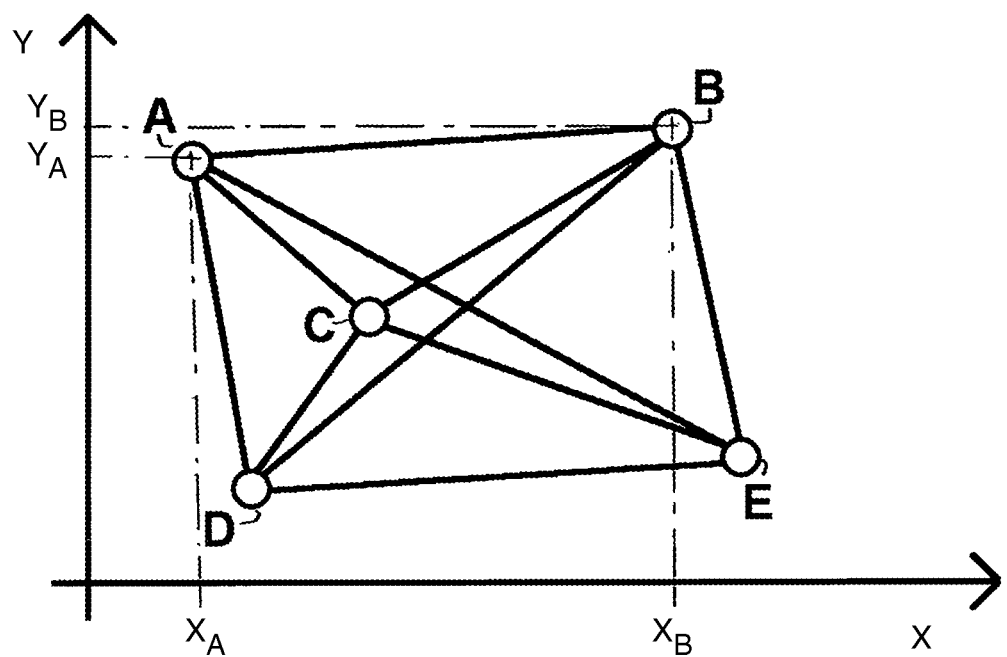
FIG. 3 is a diagram illustrating one way in which the device can authenticate the Smart Stamp tool.

FIG. 3 illustrates one manner in which such a smartphone 16 can uniquely identify a given Smart Stamp tool 10. In the example given, it is assumed that the five contact pads 14 contact the screen 20 at five locations A, B, C, D, and E, and that the smart phone's software can identify these locations to a high degree of resolution, as above. However, because it would be undesirably complicated to ensure that the contact pads 14 of the Smart Stamp tool 10 contacted the screen 20 at any particular relative position, the points of contact themselves are not used directly to unambiguously identify the particular Smart Stamp tool 10 to the smart phone 16. Instead, the spatial relationship of the contact pads 14 themselves is determined and compared to stored data.

One method that provides sufficiently many unambiguous identifications of a particular Smart Stamp is to determine the distances between the contact pads and sum these; the resolution of the screen of, for example the iPhone smart phone is adequate to provide some hundreds of thousands of unique values. This sum can be determined as follows. Assuming that these points are located by the smart phone 16 as pairs of coordinates $x_A$, $y_A$, $x_B$, $y_B$, . . . $x_E$, $Y_E$, (see FIG. 3) the distances between each pair of contact points (point A and B in the example) can be calculated by a simple Pythagorean-theorem calculation:

Distance $AB=((x_A-x_B)^2+(y_A-y_B)^2)^{1/2}$

If a similar calculation is carried out for each of the ten pairs of points AB, AC, AD, AE, BC, BD, BD, CD, CE and DE (collectively, the "pairwise distances") and the total summed, the result is a single number. This sum, as well as each of the individual pairwise distances, can then be compared to such numbers stored as part of a like number of versions of the vendor's app (that is, if the smart phone's user has downloaded similar apps from more than one vendor) to authenticate the Smart Stamp to the app.

The app can then perform the task(s) necessary to carry out the desired transaction; in the coffee shop example, the app will store, for example, the fact that a transaction has occurred, or perhaps the dollar amount (depending on the desired reward format). The app could also, once a purchase has been verified via the Smart Stamp, initiate electronic payments to settle a bill of sale for the transaction.

It will be appreciated that in the above the orientation of the Smart Stamp with respect to the screen of the smart phone is irrelevant, so long as all of the contact pads touch the screen simultaneously. This will simplify use of the tool to authenticate itself to the app.

It will be further appreciated that the total number of possible parametric descriptors of contact pad configurations, and thus the number of possible unique "keys" each identifying a given Smart Stamp to the app, is limited by the screen size, the minimum size of the contact pads, and by the minimum proximity of the contact pads. Accordingly, as an alternative to comparing pairwise distances, individually or in sum, between the observed points and the authorized points, the angles formed between lines connecting the various pairs of contact points could be calculated by the app, using simple trigonometry; the combination of the ten angles thus determined, together with the sum of the distances between the points, would also provide a large number of possible unique identifiers, so that a large number of Smart Stamps could be uniquely manufactured and identified.

Figure 4:
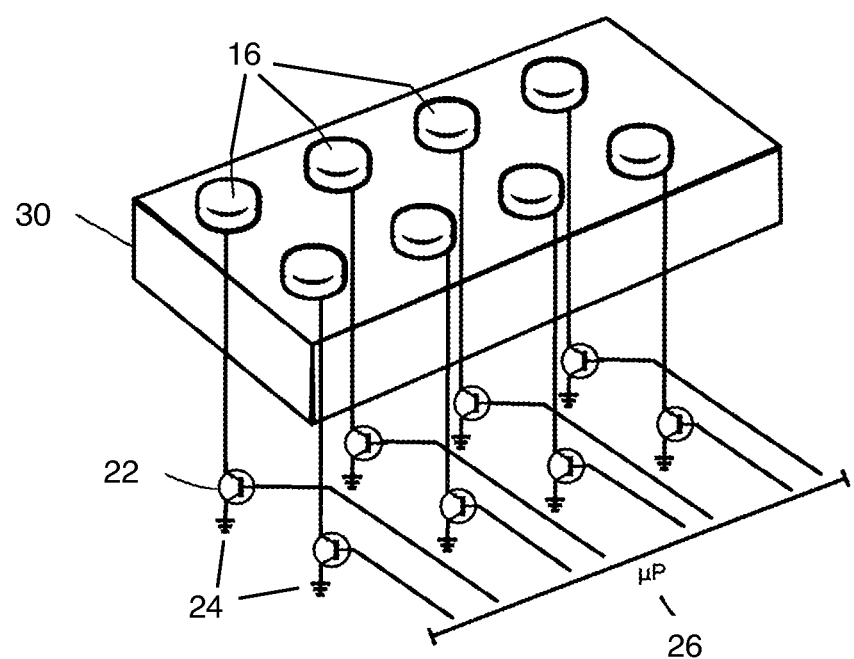
FIG. 4 is a schematic circuit illustrating one way in which the contact pads of the Smart Stamp tool can be individually activated by a microprocessor, e.g., according to a stored time sequence, so as to provide a large number of possible combinations of contact sequences.

In still a further embodiment, an array of contact pads can be actuated in a predetermined sequence, which is then detected and stored by the app for comparison to one or more stored sequences, vastly increasing the number of possible keys. The Smart Stamp in this embodiment might be configured as in FIG. 4, where the contact pads 14 are disposed on an insulative substrate 30 and each is connected by a corresponding switch 22 controlled by a microprocessor 26 to ground 24 in a defined sequence. The app will detect the physical location and timing of a sequence, e.g., AAABD-EDCD, and compare it to one or more stored sequences to identify the Smart Stamp tool. (As described the smart phone will not "know" which pad is A, which is B, and so on, but can in turn assign each pad to one of A, B, C, D, and E, compare the sequence to the stored sequences, reassign the pads, perform the comparison again, and so on until a match is determined, or not, as the case may be.) In this embodiment the number of contact pads is not limited by the number of contact points the smart device can simultaneously locate.

Other methods of identifying unique Smart Stamps to the app will occur to those of skill in the art, and are within the scope of the invention. For example, the Smart Stamp could be moved slightly while in contact with the screen. In this embodiment, the general orientation of the stamp, or a movement of the stamp across the phone screen, could be used to communicate additional information about the transaction in question. For example, if a café sells both bagels and coffee, pressing the Smart Stamp to a phone screen and "swiping" the Stamp towards the bottom of the phone could indicate a purchase of coffee, while "swiping" the Stamp toward the top of the phone screen could indicate the purchase of a bagel.

Applications for this invention extend beyond customer loyalty programs, such as the coffee shop example discussed above. For example, this invention could be used in all manner of circumstances in which a function performed by a smartphone/tablet device needs to be approved by an authenticated party that is physically present at the location where the device is in operation.

Specific examples include, but are not limited to:

"Signing" for the delivery of packages or documents (the deliverer would carry a smart device, and the recipient would have a unique Smart Stamp which would be used to indicate that they had received the delivery.)

Authorizing medical prescriptions (the patient would have an app that would submit their prescription to a pharmacy, and the doctor would authenticate the prescription with the Smart Stamp. The pharmacist would have a second Smart Stamp, which would be used to authenticate the transaction on the patient's smartphone and deliver the prescription.)

Personal identification (in a controlled access situation, such as a concert, sporting event, or other access-controlled physical facilities, the user's Smart Stamp could be used to contact an intelligent device, identifying the user to the device, and providing access.) Alternatively, a Smart Stamp could be commissioned to a specific access control point, and a user would authenticate their presence, and possibly trigger further automated functionality at the facility, by touching their smart device to the Smart Stamp at the controlled access point. For example, a secure facility's entry door could have a Smart Stamp. A user would touch their smart device to the Smart Stamp at the door, which would trigger, via digital communication with a computer and associated computer-actuated door lock, the unlocking of the door.

Accordingly, the steps in the method of the invention can be summarized as follows. In the example, we again address the coffee shop loyalty program discussed above.

The proprietor of the Smart Stamp first enlists the coffee shop as a customer. This entails providing the coffee shop with at least one Smart Stamp per location, and customizing an app for the coffee shop.

The coffee shop then enlists customers, who download the app to their personal smartphone devices.

Thereafter, when the customers make purchases at the coffee shop, they activate the app and input the number and identification of goods purchased, the total sales amount, or otherwise, depending on the details of the loyalty program selected by the coffee shop. The user then presents the smart phone to the cashier, who contacts the screen with the Smart Stamp. The app then recognizes the Smart Stamp, and stores the transaction details.

When the app recognizes that the requirements of the loyalty program entitling the user to a reward have been met; the app so indicates on the screen; the user shows this to the cashier, who makes the appropriate adjustment to the total amount of currency due by the customer as part of the transaction in question. The app then resets the stored total of purchases for future use.

While a preferred embodiment of the invention has been disclosed, the invention is not to be limited thereto, but only by the following claims.

What is claimed is:

1. A method for authentication on an electronic device having a capacitive touch sensor comprising:

detecting, on the capacitive touch sensor, a first set of points of capacitively interactive contact resulting from proximity of a hardware tool to the capacitive touch sensor, wherein the hardware tool is not a human hand; wherein the first set of points is arranged in a spatial pattern; wherein detecting the first set of points comprises detecting the first set of points substantially simultaneously;

computing, from the first set of points, a first set of parametric descriptors;

generating a first comparison between the first set of parametric descriptors and a set of known parametric descriptors; and authenticating an event on the electronic device based on the first comparison.

2. The method of claim 1, further comprising:

detecting, on the capacitive touch sensor, a second set of points of capacitively interactive contact from the hardware tool, wherein the second set of points is detected an elapsed time after the first set of points is detected;

computing, from the second set of points, a second set of parametric descriptors; and generating a second comparison between the second set of parametric descriptors and the set of known parametric descriptors;

wherein authenticating an event on the electronic device further comprises authenticating an event on the electronic device based on the first comparison and the second comparison.

3. The method of claim 2, wherein authenticating an event on the electronic device further comprises authenticating an event on the electronic device based on the first comparison, the second comparison, and the elapsed time.

4. The method of claim 3, further comprising electrically configuring the hardware tool to present the first set of points of capacitively interactive contact to the electronic device; and electrically reconfiguring the hardware tool to present the second set of points of capacitively interactive contact to the electronic device.

5. The method of claim 3, further comprising detecting a motion of the hardware tool relative to the electronic device; wherein authenticating an event on the electronic device further comprises authenticating an event on the electronic device based on the motion.

6. The method of claim 5, wherein detecting the motion further comprises detecting the motion after detecting the first set of points and before detecting the second set of points.

7. The method of claim 2, further comprising electrically configuring the hardware tool to present the first set of points of capacitively interactive contact to the electronic device; and electrically reconfiguring the hardware tool to present the second set of points of capacitively interactive contact to the electronic device.

8. The method of claim 7, wherein electrically configuring the hardware tool further comprises electrically configuring the hardware tool with a microprocessor; wherein electrically reconfiguring the hardware tool further comprises electrically reconfiguring the hardware tool with the microprocessor.

9. The method of claim 1, further comprising determining an orientation of the hardware tool from the first set of points; wherein computing the first set of parametric descriptors further comprises computing, from the first set of points and the orientation, the first set of parametric descriptors.

10. The method of claim 1, further comprising detecting a motion of the hardware tool relative to the electronic device; wherein computing the first set of parametric descriptors further comprises computing, from the first set of points and the motion, the first set of parametric descriptors.

11. The method of claim 10, further comprising determining an orientation of the hardware tool from the first set of points; wherein computing the first set of parametric descriptors further comprises computing, from the first set of points, the motion, and the orientation, the first set of parametric descriptors.

12. The method of claim 1, wherein authenticating the event comprises sending data characterizing the first comparison to an external authentication server and receiving an authentication response from the external authentication server.

13. A method for authentication on an electronic device having a capacitive touch sensor comprising:

detecting, on the capacitive touch sensor, a sequence of capacitively interactive contacts from a hardware tool, wherein the hardware tool is not a human hand, wherein the sequence of capacitively interactive contacts is characterized by a sequence length and by timings between contacts, wherein each capacitively interactive contact comprises a set of points of capacitively interactive contact arranged in a spatial pattern, wherein the spatial pattern has an orientation relative to the capacitive touch sensor;

measuring a motion of the hardware tool during the sequence of capacitively interactive contacts;

computing a set of parametric descriptors based upon the sequence of capacitively interactive contacts, the sequence length, the timings between contacts, the motion of the hardware tool, and each capacitively interactive contact; wherein computing based upon each capacitively interactive contact comprises computing based upon the set of points of the capacitively interactive contact, the spatial pattern of the set of points, and the orientation of the spatial pattern;

generating a comparison between the set of parametric descriptors and a set of known parametric descriptors; and, authenticating an event on the electronic device based on the comparison.

14. A hardware tool for authentication on an electronic device having a capacitive touch sensor, the hardware tool comprising:

a dielectric substrate;

a microprocessor;

a set of conductive contact pads arranged in a spatial pattern on the dielectric substrate and connected to the microprocessor;

memory storing a first sequence for switching the switches; and a hardware means for actuating the first sequence;

wherein the set of conductive contact pads is configured to create a change in capacitance detectable by the capacitive touch sensor of the electronic device when the hardware tool is in proximity to and is oriented relative to the electronic device;

wherein the microprocessor is configured to alter a capacitance of each of the set of conductive contact pads by controlling switches connected to each of the set of conductive contact pads.

15. The hardware tool of claim 14, further comprising memory storing a second sequence for switching the switches; wherein the hardware means for actuating the first sequence comprises a hardware means for selecting and actuating a chosen sequence of the first and second sequences.

16. The hardware tool of claim 15, wherein a first conductive contact pad of the set of conductive contact pads is of a first conductivity and a second conductive contact pad of the set of conductive contact pads is of a second conductivity.

17. The hardware tool of claim 15, wherein each of the set of conductive contact pads is recessed into the dielectric substrate.

\* \* \* \* \*